(12) United States Patent
Yang et al.

(10) Patent No.: US 11,327,270 B2
(45) Date of Patent: May 10, 2022

(54) PORTABLE ELECTRONIC DEVICE, CAMERA MODULE, AND LENS ASSEMBLY

(71) Applicant: Samsung Electro-Mechanics Co., Ltd., Suwon-si (KR)

(72) Inventors: Dong Shin Yang, Suwon-si (KR); Jong Gill Lee, Suwon-si (KR); Hwan Soo Park, Suwon-si (KR); Ju Sung Park, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/951,618

(22) Filed: Nov. 18, 2020

(65) Prior Publication Data

US 2021/0072488 A1 Mar. 11, 2021

Related U.S. Application Data

(63) Continuation of application No. 16/590,797, filed on Oct. 2, 2019, now Pat. No. 10,866,381, which is a
(Continued)

(30) Foreign Application Priority Data

Dec. 12, 2017 (KR) .......................... 10-2017-0170320
Mar. 27, 2018 (KR) .......................... 10-2018-0035443

(51) Int. Cl.
*G02B 7/02* (2021.01)
*H04N 5/225* (2006.01)
*G02B 13/00* (2006.01)

(52) U.S. Cl.
CPC ............. *G02B 7/026* (2013.01); *G02B 7/021* (2013.01); *G02B 7/022* (2013.01); *H04N 5/2254* (2013.01);
(Continued)

(58) Field of Classification Search
None
See application file for complete search history.

(56) References Cited

U.S. PATENT DOCUMENTS 3,076,382 A 2/1963 Dowling
5,905,599 A 5/1999 Nomura et al.
(Continued)

FOREIGN PATENT DOCUMENTS

CN 2624231 Y 7/2004
CN 1837942 A 9/2006
(Continued)

OTHER PUBLICATIONS

Korean Office Action dated Jul. 16, 2019, in counterpart Korean Application No. 10-2018-0035443 (13 pages in English, 8 pages in Korean).
(Continued)

*Primary Examiner* — Clayton E. LaBalle
*Assistant Examiner* — Diana Hancock
(74) *Attorney, Agent, or Firm* — NSIP Law

(57) ABSTRACT

A lens assembly includes a lens including an optical portion refracting light and a flange portion extended along a periphery of at least a portion of the optical portion, and a lens barrel accommodating the lens. The lens includes a first D-cut portion on one side surface of the flange portion spaced apart from the lens barrel and a second D-cut portion on another side surface of the flange portion spaced apart from the lens barrel, wherein the first D-cut portion and the second D-cut portion each include first inclined surfaces, and the first inclined surfaces are spaced apart from respective ends of the first D-cut portion and the second D-cut portion by a predetermined interval.

19 Claims, 10 Drawing Sheets

Related U.S. Application Data continuation of application No. 16/149,541, filed on Oct. 2, 2018, now Pat. No. 10,473,880.

(52) U.S. Cl.
CPC .......... *G02B 13/001* (2013.01); *H04N 5/2252* (2013.01); *H04N 5/22525* (2018.08)

(56) References Cited

U.S. PATENT DOCUMENTS

| | | | |
|---|---|---|---|
| 6,157,501 | A | 12/2000 | Sato et al. |
| 7,561,343 | B2 | 7/2009 | Hankawa et al. |
| 10,295,783 | B2 | 5/2019 | Sekimoto et al. |
| 10,473,880 | B2 * | 11/2019 | Yang .................. G02B 7/021 |
| 10,866,381 | B2 * | 12/2020 | Yang .................. H04N 5/2254 |
| 2004/0036964 | A1 | 2/2004 | Huang et al. |
| 2006/0002694 | A1 | 1/2006 | Mihara et al. |
| 2010/0232161 | A1 | 9/2010 | Aschwanden et al. |
| 2011/0075276 | A1 | 3/2011 | Lin et al. |
| 2011/0290137 | A1 | 12/2011 | Hatakeyama et al. |
| 2013/0265660 | A1 | 10/2013 | Yoshida et al. |
| 2014/0254034 | A1 | 9/2014 | Lyu |
| 2015/0215541 | A1 | 7/2015 | Nomura et al. |
| 2016/0134813 | A1 | 5/2016 | Hu et al. |
| 2016/0139359 | A1 | 5/2016 | Lin et al. |
| 2017/0235095 | A1 | 8/2017 | Sekimoto et al. |
| 2017/0242225 | A1 | 8/2017 | Fiske |
| 2017/0307841 | A1 | 10/2017 | Nakamura et al. |
| 2018/0196171 | A1 | 7/2018 | Hsu et al. |
| 2019/0174032 | A1 | 6/2019 | Yang et al. |
| 2019/0179098 | A1 | 6/2019 | Yang et al. |
| 2019/0179103 | A1 | 6/2019 | Yang et al. |
| 2020/0057179 | A1 | 2/2020 | Yang et al. |
| 2021/0072488 | A1 * | 3/2021 | Yang .................. G02B 7/026 |

FOREIGN PATENT DOCUMENTS

| | | | |
|---|---|---|---|
| CN | 103364915 | A | 10/2013 |
| CN | 104280794 | A | 1/2015 |
| CN | 204359995 | U | 5/2015 |
| CN | 107076960 | A | 8/2017 |
| JP | H11-109107 | A | 4/1999 |
| JP | 2005-107214 | A | 4/2005 |
| JP | 4001986 | B2 | 10/2007 |
| JP | 2009-157279 | A | 7/2009 |
| JP | 4477336 | B2 | 6/2010 |
| KR | 10-2008-0063593 | A | 7/2008 |
| KR | 10-2012-0007273 | A | 1/2012 |
| KR | 10-2015-0091010 | A | 8/2015 |
| KR | 10-2108199 | B1 | 5/2020 |
| TW | M545257 | U | 7/2017 |
| WO | WO 2016/067731 | A1 | 5/2016 |

OTHER PUBLICATIONS

Chinese Office Action dated Oct. 10, 2020, in counterpart Chinese Patent Application No. 201811469148.4 (11 pages in English, 12 pages in Chinese).

U.S. Appl. No. 16/590,797, filed Oct. 2, 2019, Dong Shin Yang et al., Samsung Electro-Mechanics Co., Ltd.

* cited by examiner

PORTABLE ELECTRONIC DEVICE, CAMERA MODULE, AND LENS ASSEMBLY

CROSS-REFERENCE TO RELATED APPLICATIONS

This application is a continuation of application Ser. No. 16/590,797 filed on Oct. 2, 2019, now U.S. Pat. No. 10,866,381 issued on Dec. 15, 2020, which is a continuation of application Ser. No. 16/149,541 filed on Oct. 2, 2018, now U.S. Pat. No. 10,473,880 issued on Nov. 12, 2019, and claims the benefit under 35 USC 119(a) of Korean Patent Application Nos. 10-2017-0170320 filed on Dec. 12, 2017, and 10-2018-0035443 filed on Mar. 27, 2018, in the Korean Intellectual Property Office, the entire disclosures of which are incorporated herein by reference for all purposes.

BACKGROUND

1. Field

This application relates to a lens assembly and a camera module including the same.

2. Description of Related Art

Camera modules are used in portable electronic devices such as smartphones, and in recent years, miniaturization of such camera modules mounted in portable electronic devices has been required in accordance with demand for miniaturization of portable electronic devices. In addition, it is required to improve performance of the camera module separately from the necessity of miniaturization of the camera module.

However, since various configurations should be added to improve the performance of the camera module, it may be difficult to reduce a size of the camera module.

Further, in a case in which the size of each configuration of the camera module is simply reduced in order to miniaturize the camera module, unintended reflection of light may occur inside the camera module.

Light reflected from a subject and incident on the inside of a lens barrel may be refracted while passing through a plurality of lenses. In this case, the refracted light may be reflected from an inner surface or other configurations of the lens barrel, and in a case in which the reflected light is incident on an image sensor or around the image sensor, a flare phenomenon may occur.

The light reflected from the inside of the camera module is light that is not related to image formation, and causes a flare or ghost phenomenon in the captured image.

Therefore, a new method for minimizing the size of the camera module while securing the performance of the camera module, and improving quality of the captured image, is required.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a lens including an optical portion refracting light and a flange portion extended along a periphery of at least a portion of the optical portion, and a lens barrel accommodating the lens. The lens includes a first D-cut portion on one side surface of the flange portion spaced apart from the lens barrel and a second D-cut portion on another side surface of the flange portion spaced apart from the lens barrel, wherein the first D-cut portion and the second D-cut portion each include first inclined surfaces, and wherein the first inclined surfaces are spaced apart from respective ends of the first D-cut portion and the second D-cut portion by a predetermined interval.

The lens assembly may further include planarized surfaces between the first inclined surface and the end of the first D-cut portion, and between the first inclined surface and the end of the second D-cut portion.

The lens assembly may further include a first rib protruding from the flange portion along the periphery of the optical portion on one surface of the lens, wherein both opposite end surfaces of the first rib are connected to the first D-cut portion and the second D-cut portion, respectively.

The lens assembly may further include a second rib protruding from the flange portion along the periphery of the optical portion on another surface of the lens, wherein both opposite end surfaces of the second rib are spaced apart from the first D-cut portion and the second D-cut portion by a predetermined interval.

The lens assembly may further include planarized surfaces between each of the opposite end surfaces of the second rib and the respective first D-cut portion and the second D-cut portion.

Both of the opposite end surfaces of the second rib may include second inclined surfaces, and the second inclined surfaces may be spaced apart from respective ends of the second rib by a predetermined interval.

The lens assembly may further include planarized surfaces between the second inclined surfaces and the respective ends of the second rib.

The first inclined surfaces and the second inclined surfaces may have inclined directions different from each other.

At least three surfaces of the lens and the lens barrel may be in contact with each other.

The flange portion may include circular arc portions connecting the first D-cut portion and the second D-cut portion to each other, and the circular arc portions may include a third D-cut portion, and the third D-cut portion may be spaced apart from the lens barrel.

A length of a straight line connecting the first D-cut portion and the second D-cut portion to each other while passing through an optical axis may be shorter than a length of a straight line connecting the circular arc portions to each other while passing through the optical axis.

The first D-cut portion, the second D-cut portion, and the third D-cut portion may include planar surfaces.

The planar surface of the first D-cut portion, the planar surface of the second D-cut portion, and the planar surface of the third D-cut portion may have different degrees of surface roughness.

The lens assembly may further include a plurality of lenses disposed in the lens barrel and disposed to be closer to an object side than the lens, a shape of the plurality of lenses and a shape of the lens may be different from each other.

A portable electronic device may include the lens assembly disposed in a camera module.

In another general aspect, a camera module includes a lens including an optical portion refracting light and a flange portion extended along a periphery of at least a portion of the optical portion, and a lens barrel accommodating the lens. The flange portion includes a first D-cut portion, a second D-cut portion opposite to the first D-cut portion, a circular arc portion connecting the first D-cut portion and the second D-cut portion to each other, and a third D-cut portion in the circular arc portion, the circular arc portion is in contact with the lens barrel, and the first D-cut portion, the second D-cut portion, and the third D-cut portion are spaced apart from the lens barrel, and wherein the first D-cut portion and the second D-cut portion include respective boundary lines that separate the remaining surfaces of the first D-cut portion and the second D-cut portion from an end of the first D-cut portion and an end of the second D-cut portion.

The boundary lines may be planar lines which are continuously connected.

The camera module may be a portable electronic device, and may further include a display, wherein the camera module may be installed as a front camera of the portable electronic device along with the display or as a back camera on a side of the portable electronic device other than a side with the display.

Other features and aspects will be apparent from the following detailed description, the drawings, and the claims.

DETAILED DESCRIPTION

Figure 1:
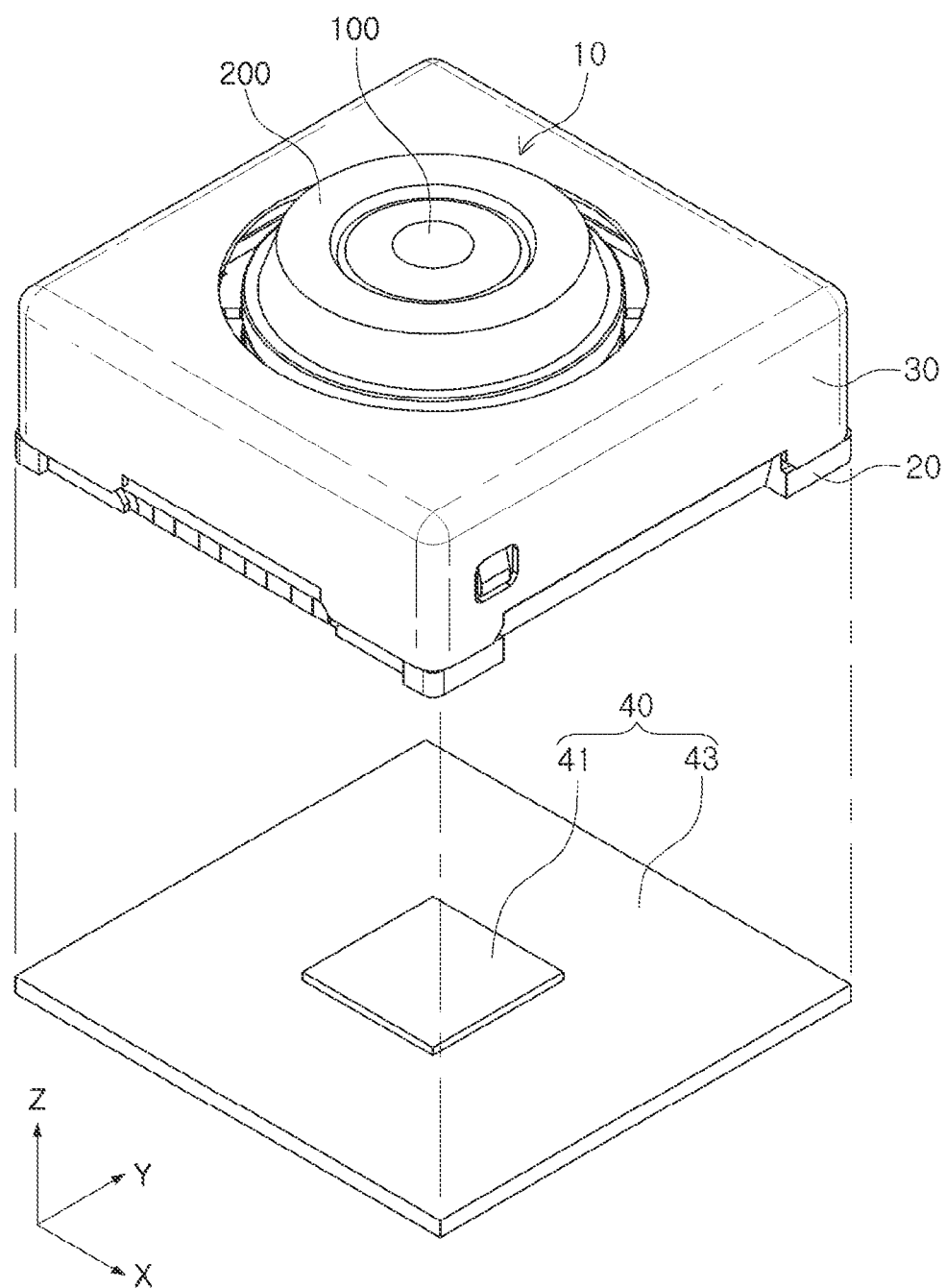
FIG. 1 is a perspective view of a camera module according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An aspect of the present disclosure may provide a portable electronic device, a camera module, and a lens assembly capable of reducing a size of the lens assembly while securing performance of the lens assembly.

In the present specification, a portable electronic device 100 may refer to a portable electronic device such as a mobile communications terminal, a smartphone, a tablet PC, or the like.

FIG. 1 is a perspective view illustrating a camera module according to one or more embodiments.

Referring to FIG. 1, the camera module may include, for example, a lens assembly 10, a housing 20 accommodating the lens assembly 10, a case 30 coupled to the housing 20, and an image sensor module 40 converting light incident through the lens assembly 10 into an electrical signal.

The lens assembly 10 may include a lens barrel 200 and at least one lens, for example.

The at least one lens may be accommodated in the lens barrel 200. The at least one lens may be arranged from an object side to an image side (an image sensor 41 side) in an optical axis direction.

In a case in which the at least one lens includes two or more lenses, each lens may have optical characteristics, such as the same or different refraction power, refractive index, Abbe number, thickness, image-side and/or object-side surface radii of curvature, or the like.

The lens barrel 200 may be accommodated in the housing 20.

As an example, the housing 20 may have a shape of which the top and the bottom are opened, and the lens barrel 200 may be accommodated in an internal space of the housing 20.

The image sensor module 40 may be disposed on the bottom of the housing 20.

In addition, an actuator that moves the lens assembly 10 for focusing and/or image stabilization may be disposed on the housing 20.

The lens assembly 10 may be moved in the optical axis direction (Z-axis direction) by the actuator to perform the focusing, and may be moved in a direction (X-axis direction and/or Y-axis direction) perpendicular to the optical axis to perform the image stabilization at the time of capturing the image.

The case 30 may be coupled to the housing 20, and may serve to protect internal components of the camera module.

In addition, the case 30 may serve to shield electromagnetic waves.

As an example, the case 30 may shield electromagnetic waves generated from the camera module so that the electromagnetic waves do not have an influence on other electronic components in the portable electronic device.

In addition, since several electronic components as well as the camera module are mounted in the portable electronic device 1000 (FIG. 13), the case 30 may shield electromagnetic waves generated from these electronic components so that the electromagnetic waves do not have an influence on the camera module.

The case 30 may be formed of metal and thus may be grounded to a ground pad provided on the printed circuit board 43, resulting in shielding of electromagnetic waves.

The image sensor module 40 may be a device configured to convert light incident through the lens assembly 10 into an electrical signal.

As an example, the image sensor module 40 may include an image sensor 41 and a printed circuit board 43 connected to the image sensor 41, and may further include an infrared filter.

The infrared filter may cut off light in an infrared region in the light incident through the lens assembly 10.

The image sensor 41 may convert the light incident through the lens assembly 10 into an electrical signal. As an example, the image sensor 41 may be a charge coupled device (CCD) or a complementary metal oxide semiconductor (CMOS).

The electrical signal converted by the image sensor 41 may be output as an image through a display unit 300 of the portable electronic device 1000.

The image sensor 41 may be fixed to the printed circuit board 43, and may be electrically connected to the printed circuit board 43 by wire bonding.

Figure 2:
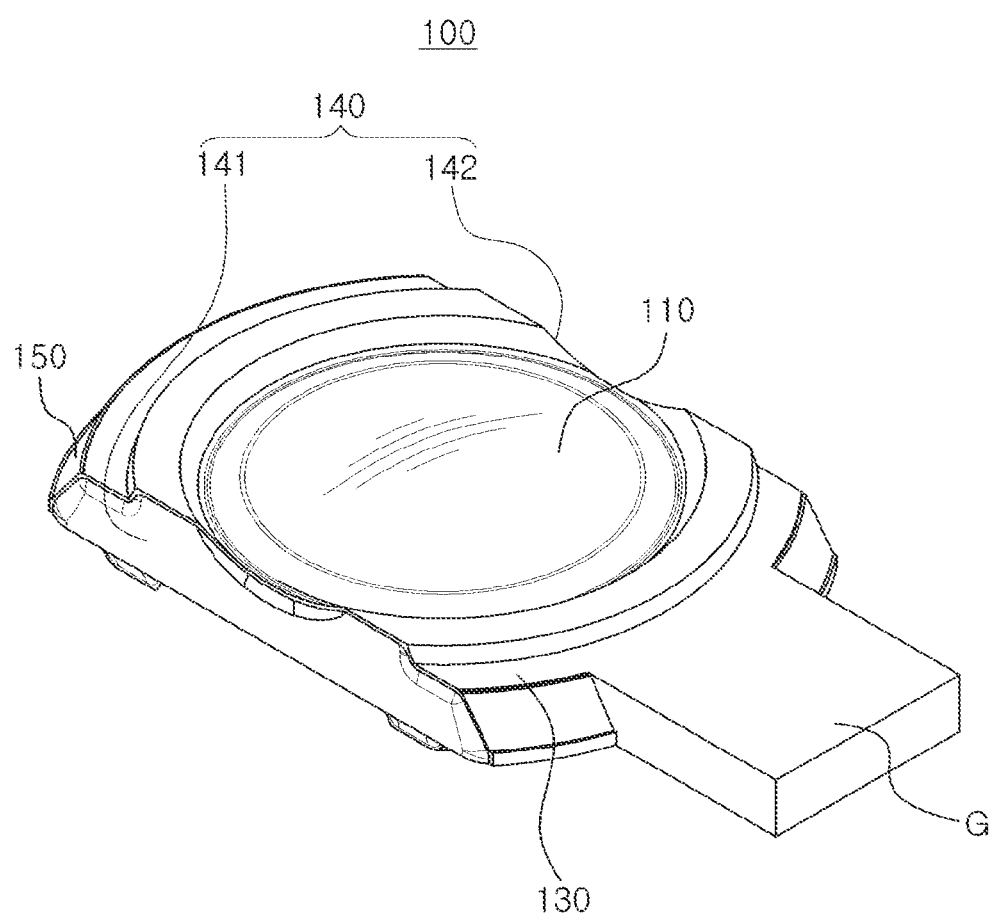
FIGS. 2 and 3 are perspective views showing a lens of a lens assembly according to one or more embodiments.
Figure 3:
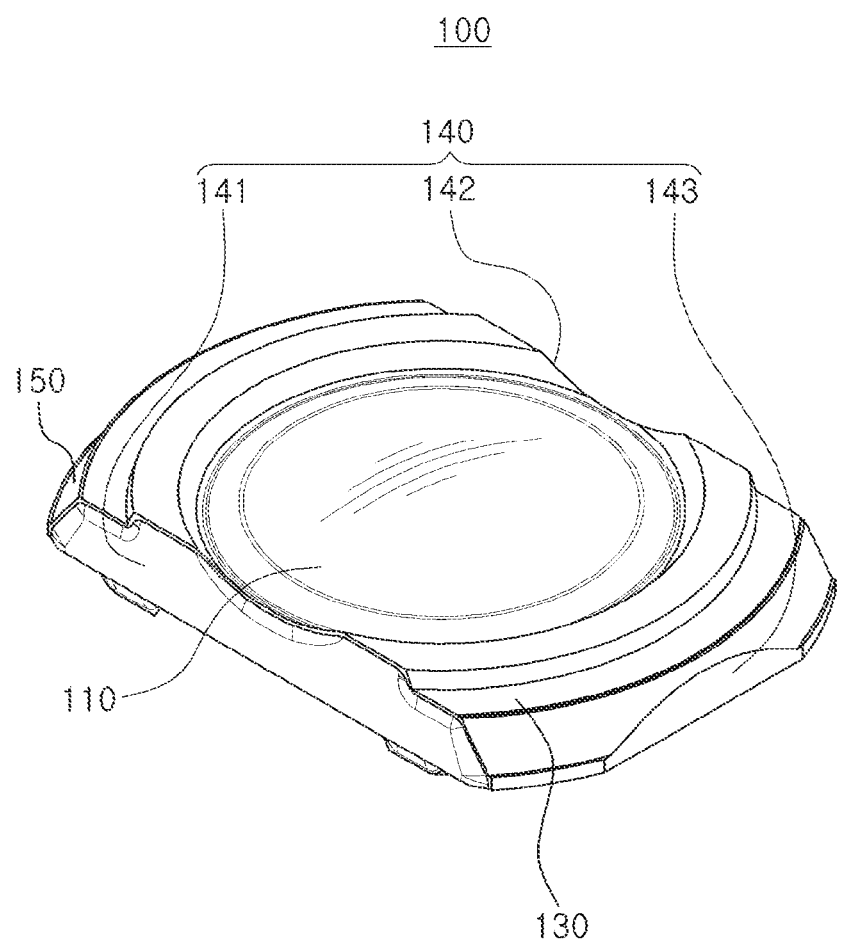

FIGS. 2 and 3 are perspective views showing a lens of a lens assembly according to one or more embodiments.

The lens assembly 10 may include a plurality of lenses, but one lens will be described for convenience of explanation.

Referring to FIGS. 2 and 3, a lens 100 may include an optical portion 110 and a flange portion 130 formed at a periphery of at least a portion of the optical portion 110.

The optical portion 110 may be a portion in which optical performance of the lens 100 is exhibited. As an example, light reflected by a subject may be refracted while passing through the optical portion 110.

The optical portion 110 may have positive or negative refractive power, may have a spherical surface shape or an aspherical surface shape, and may have a concave, convex, or meniscus shape in a paraxial region (a portion adjacent to an optical axis).

The flange portion 130 may be a portion that fixes the lens 100 to another component, for example, the lens barrel 200 or another lens.

The flange portion 130 may be extended along a periphery of at least a portion of the optical portion 110 and may be formed integrally with the optical portion 110.

The lens 100 may be formed of plastic and may be injection-molded through a molding.

In general, in a case in which the lens 100 is injection-molded through the molding, a gate portion G may be formed at a portion corresponding to a passage through which a resin material is introduced (see FIG. 2). In order to remove the gate portion G, a portion of a side surface of the flange portion 130 of the lens 100 may be cut in the optical axis direction to thereby form a D-cut portion.

In this case, the optical portion 110 of the lens 100 may be generally formed in a circular shape, but the flange portion 130 may have a 'D' shape in which a portion thereof is removed. Hereinafter, a portion having the 'D' shape is referred to as the D-cut portion. For reference, the meaning of 'cut' in the D-cut portion is not limited to the meaning of cutting.

The flange portion 130 of at least one lens 100 of the lens assembly 10 according to one or more embodiments may include D-cut portions 140 and circular arc portions 150.

D-cut portions 140 may refer to plane portions formed in the flange portion 130 and the circular arc portion 150 may refer a portion formed in a circular arc shape to connect the D-cut portions 140 to each other.

Here, 'plane' is not limited to a perfect plane, but may include, for example, a substantially planar surface or shape, for example, a plane within a tolerance at a time of manufacturing. Similarly, the 'circular arc' is not limited to a perfect circular arc, but may include, for example, a substantially arcuate shape, for example, a circular arc within a tolerance at the time of manufacturing.

The D-cut portions 140 may be formed in at least three regions of the flange portion 130. For example, two D-cut portions 141, 142 may be formed at positions which are symmetrical with each other in relation to the optical axis and the remaining D-cut portion 143 may be formed at the circular arc portion 150. Here, the 'symmetry' is not limited to a perfect symmetry, but may include, for example, D-cut portions 141, 142 disposed substantially symmetrically opposing each other with respect to the optical axis, for example, including symmetrical within a tolerance at the time of manufacturing.

As an example, the D-cut portions 140 may include a first D-cut portion 141 and a second D-cut portion 142 which are symmetrical with each other in relation to the optical axis and may further include a third D-cut portion 143 formed at the circular arc portion 150.

The first D-cut portion 141 may be formed on one side surface of the flange portion 130 and the second D-cut portion 142 may be formed on another side surface (a surface opposite to the one side surface) of the flange portion. The third D-cut portion 143 may be a surface formed by cutting at least a portion of the circular arc portion 150.

Referring to FIG. 2, in at least one lens 100 of the lens assembly 10 according to one or more embodiments, the gate portion G, which is a portion corresponding to the passage through which the resin material is introduced at the time of injection-molding, may be formed at the circular arc portion 150 of the flange portion 130.

Therefore, by removing the gate portion G after the injection-molding, the third D-cut portion 143 in which a portion of the circular arc portion 150 of the flange portion 130 is removed may be formed (see FIG. 3).

The first D-cut portion 141 and the second D-cut portion 142 may be manufactured to have a 'D' shape at the time of injection-molding, but the third D-cut portion 143 may be manufactured to have the 'D' shape by removing a portion of the circular arc portion 150 after the injection. Therefore, a plane of the first D-cut portion 141 and a plane of the second D-cut portion 142 may have surface roughness different from that of a plane of the third D-cut portion 143.

Since the first D-cut portion 141 and the second D-cut portion 142 are manufactured to have the 'D' shape at the time of injection, a length of a straight line passing through the optical axis of the lens 100 and connecting the first D-cut portion 141 and the second D-cut portion 142 to each other may be shorter than a length of a straight line passing through the optical axis of the lens 100 and connecting the circular arc portions 150 to each other.

In recent years, in accordance with the demand for miniaturization of the portable electronic device 1000, the lens assembly 10 and the camera module mounted on the portable electronic device 1000 are also required to be miniaturized. Further, it is required to improve performance of the lens assembly 10 and the camera module separately from, or in addition to, the necessity of miniaturization.

At least one lens 100 of the lens assembly 10 according to one or more embodiments includes the first D-cut portion 141 and the second D-cut portion 142, symmetrical with each other in relation to the optical axis, such that the optical performance of the lens may be secured and the lens 100 may be miniaturized, and the miniaturization and performance improvement of the camera module may also be implemented.

In the present embodiments, the first D-cut portion 141 and the second D-cut portion 142 are not formed by removing a portion of the lens 100 after the injection-molding unlike a general injection lens, but may be formed to have the 'D' shape at the time of injection.

In the case of a general injection lens, since a portion of the lens is removed after injection-molding, the lens may be deformed by force applied to the lens in the process. In a case in which the lens is deformed, the optical performance of the lens may inevitably be changed.

That is, in a case in which the D-cut portions are formed to be symmetrical with each other in relation to the optical axis by removing a portion of the lens after injection-molding the lens, the lens may be miniaturized, but the performance of the lens may be deteriorated.

However, according to the examples described herein, since the first D-cut portion 141 and the second D-cut portion 142 are formed on the flange portion 130 of the lens 100 at the time of injection molding, the lens 100 may be miniaturized and the performance of the lens 100 may be secured (maintained).

Figure 4:
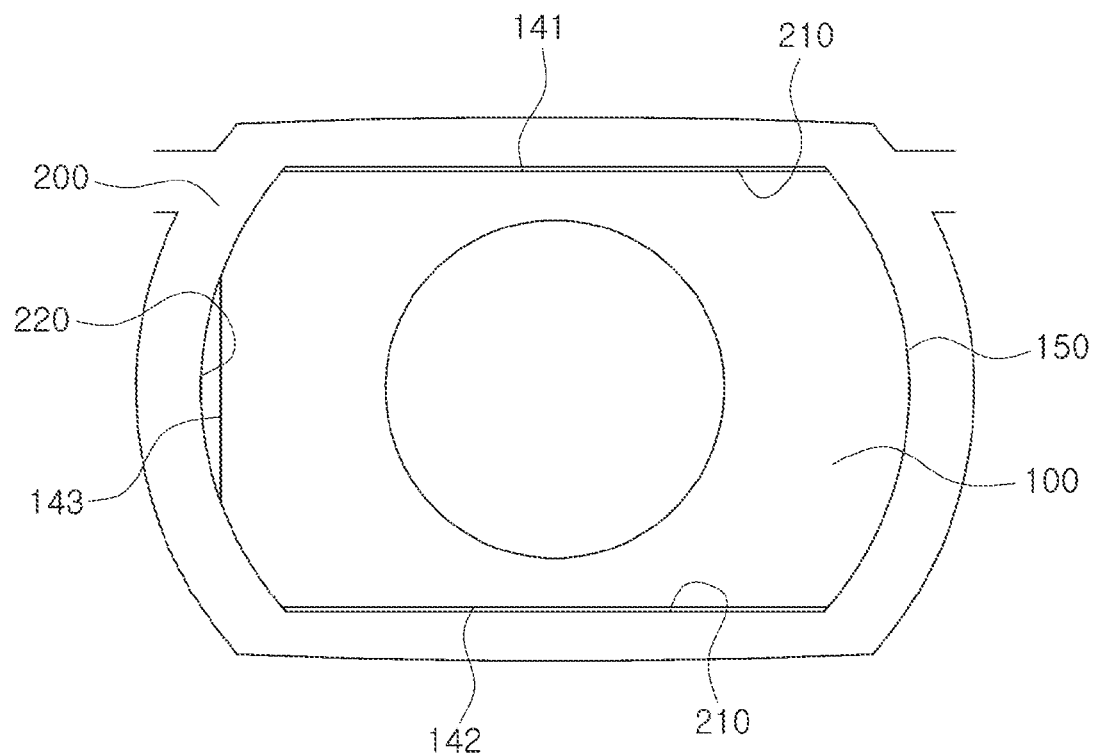
FIG. 4 is a plan view illustrating a lens of a lens assembly coupled to a lens barrel according to one or more embodiments.
Figure 5:
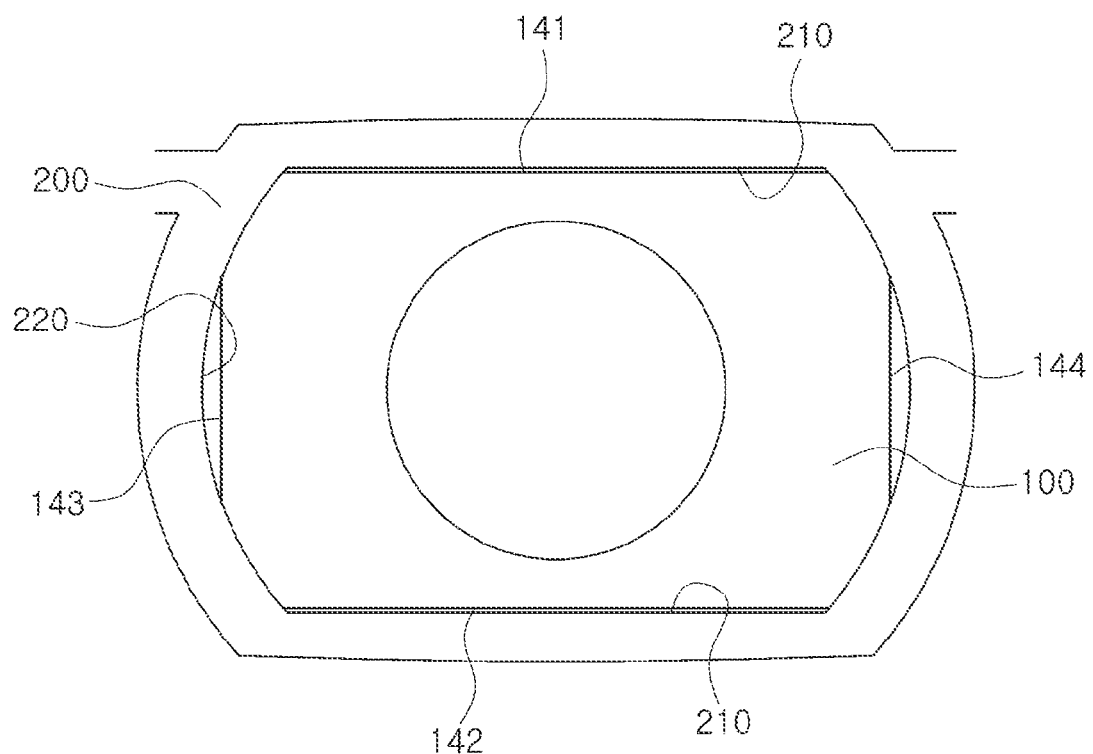
FIG. 5 is a plan view illustrating a lens of a lens assembly coupled to a lens barrel according to one or more embodiments.

FIG. 4 is a plan view illustrating a lens of a lens assembly and a lens barrel according to one or more embodiments in which the lens assembly and the lens barrel may be coupled to each other. FIG. 5 is a plan view illustrating a lens of a lens assembly and a lens barrel according to one or more embodiments in which the lens assembly and the lens barrel may be coupled to each other.

Referring to FIGS. 4 and 5, the lens barrel 200 may have a shape that is substantially similar to the lens.

The lens barrel 200 may include D-cut portions 210 and circular arc portions 220 formed on an inner surface and an outer surface.

The D-cut portion 210 of the lens barrel 200 may be formed at positions corresponding to the D-cut portions 140 of the lens 100, which are symmetrical with each other in relation to the optical axis. As an example, the D-cut portions 210 may be formed in positions corresponding to the first D-cut portion 141 and the second D-cut portion 142 of the lens 100 on the inner surface and the outer surface of the lens barrel 200.

The D-cut portions 210 of the lens barrel 200 may mean plane portions formed on the inner surface and the outer surface of the lens barrel 200, similarly to the D-cut portions 140 of the lens 100. Here, the 'plane' is not limited to a perfect plane, but may include, for example, a substantially planar surface or shape, for example, a plane within a tolerance at the time of manufacturing.

In addition, the circular arc portions 220 of the lens barrel 200 may be formed at positions corresponding to the circular arc portions 150 of the lens 100. As an example, the circular arc portions 220 may be formed in positions corresponding to the circular arc portions 150 of the lens 100 on the inner surface and the outer surface of the lens barrel 200.

The circular arc portions 220 of the lens barrel 200 may mean circular arc-shaped portions formed on the inner surface and the outer surface of the lens barrel 200, similarly to the circular arc portions 150 of the lens 100. Here, the 'circular arc' is not limited to a perfect circular arc, but may include, for example, a substantially arcuate shape, for example, a circular arc within a tolerance at the time of manufacturing.

In the present embodiments, the lens barrel 200 and the lens 100 may be configured so that at least three surfaces are in contact with each other (FIG. 4). The D-cut portions 140 of the lens 100 may be configured to be in a state of non-contact with the lens barrel 200, and the circular arc portions 150 of the lens 100 may be configured to be in contact with the lens barrel 200. As an example, the D-cut portions 210 of the lens barrel 200 and the D-cut portions 140 of the lens 100 may be disposed to be spaced apart from each other in a direction perpendicular to the optical axis, and the circular arc portions 220 of the lens barrel 200 and the circular arc portions 150 of the lens 100 may be disposed so that at least three surfaces are in contact with each other.

The lens barrel 200 and the lens 100 may be manufactured by an injection process, and since the lens barrel 200 and the lens 100 may not be easily manufactured precisely to predetermined dimensions in design, a certain range of errors may be involved.

For example, the circular arc portions 220 of the lens barrel 200 and the circular arc portions 150 of the lens 100 may not actually be a perfect circular arc shape, but may be injection-molded so as to be close to the circular arc shape. Therefore, the circular arc portions 220 of the lens barrel 200 and the circular arc portions 150 of the lens 100 may have better roundness.

Here, the roundness refers to the degree to which a shape of a processing circle conforms to a shape of a real circle (ideal round circle), and good roundness refers to the shape of the processing circle being close to that of a real circle.

Meanwhile, the roundness of the circular arc portions 220 of the lens barrel 200 and the roundness of the circular arc portions 150 of the lens 100 may be different from each other. Therefore, when the lens 100 is inserted into the lens barrel 200, there may be a difference in force applied to one portion than another portion of the lens 100 due to a difference in roundness between the lens barrel 200 and the lens 100.

For example, when the lens 100 is inserted into the lens barrel 200, there may be a deviation in force applied to the circular arc portions 150 of the lens 100, due to the difference in roundness between the lens barrel 200 and the arc portions 150 of the lens 100, resulting in the lens 100 being asymmetrically deformed.

When the lens 100 is inserted into the lens barrel 200, since the force is applied to the lens 100 by contact between the lens barrel 200 and the lens 100, the lens 100 may be finely deformed. In a case in which the lens 100 is uniformly deformed as a whole, since the optical performance of the lens 100 is uniformly distorted as a whole, the lens 100 may be manufactured in consideration of such error in a process of design.

However, in a case in which the lens 100 is asymmetrically deformed, there is a problem that it may be difficult to predict how the optical performance of the lens 100 is distorted after coupling the lens 100 to the lens barrel 200.

In particular, in a case in which the lens barrel 200 and the lens 100 are brought into two-surface contact, a difference in the optical performance may occur between one side and the other side of the lens 100.

However, in the lens assembly 10 according to the examples described herein, since the lens barrel 200 and the lens 100 are configured so that at least three surfaces are in contact with each other, the deviation in the force applied to the lens 100 according to the difference in the roundness may be significantly reduced. Accordingly, the asymmetrical distortion of the optical performance of the lens 100 may be prevented.

Referring to FIG. 4, the lens 100 includes first D-cut portion 141, second D-cut portion 142, third D-cut portion 143, and circular arc portions 150, and the lens barrel 200 includes D-cut portions 210 and circular arc portions 220.

The circular arc portions 220 of the lens barrel 200 and the circular arc portions 150 of the lens 100 may be configured so that three surfaces are in contact with each other. For example, a first surface of the circular arc portion 150 of the lens 100 may be in contact with a first surface of the circular arc portion 220 of the lens barrel 200 on the right side of FIG. 4 and second and third surfaces of the circular arc portion 150 of the lens 100 may be in contact with second and third surfaces of the circular arc portion 220 of the lens barrel 200 on the left side of FIG. 4.

Referring to FIG. 5, lens 100 may include a first D-cut portion 141, a second D-cut portion 142, a third D-cut portion 143, a fourth D-cut portion 144, and circular arc portions 150, and the lens barrel 200 may include D-cut portions 210 and circular arc portions 220.

The circular arc portions 220 of the lens barrel 200 and the circular arc portions 150 of the lens 100 may be configured so that four surfaces are in contact with each other.

The lens barrel 200 and the lens 100 are illustrated in the various embodiments of FIGS. 4 and 5 so that the three surfaces or the four surfaces are in contact with each other, but are not limited thereto, and may also be configured so that five or more surfaces are in contact with each other. However, also in this case, the D-cut portions 140 of the lens 100 and the D-cut portions 210 of the lens barrel 200 may be configured to be spaced apart from each other.

Figure 6:
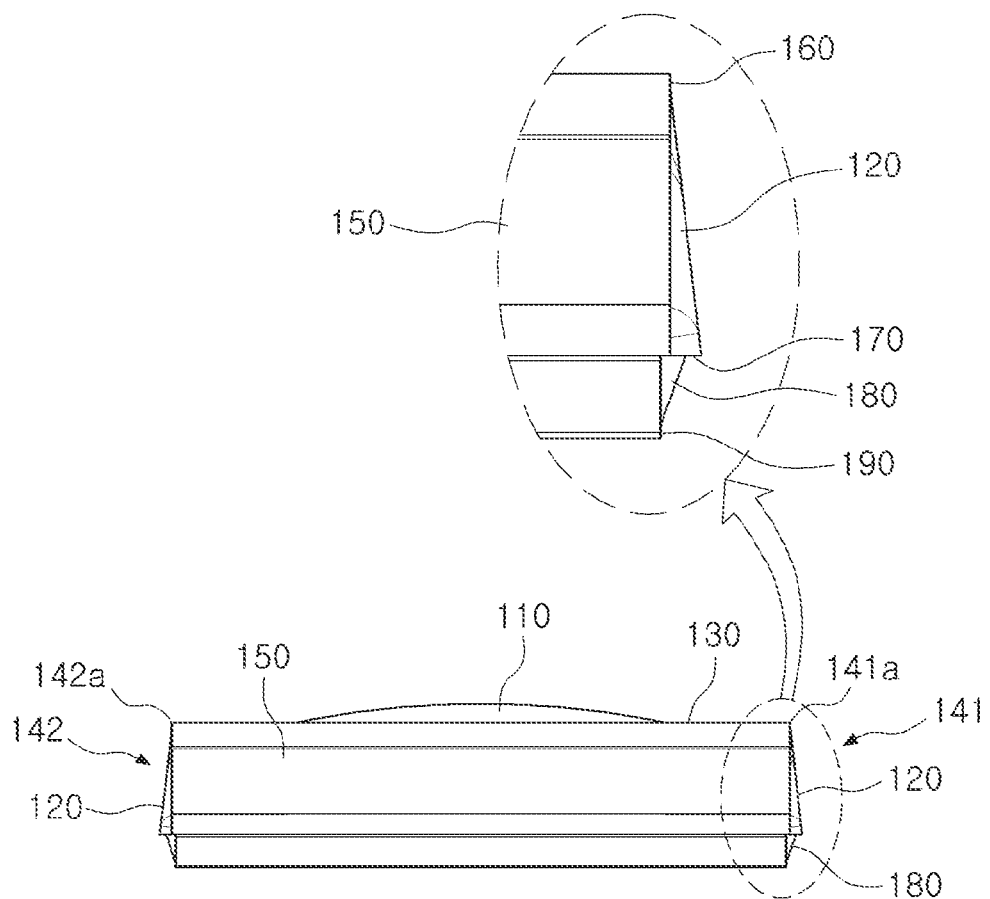
FIGS. 6 and 7 are side views of a lens of a lens assembly according to one or more embodiments.
Figure 7:
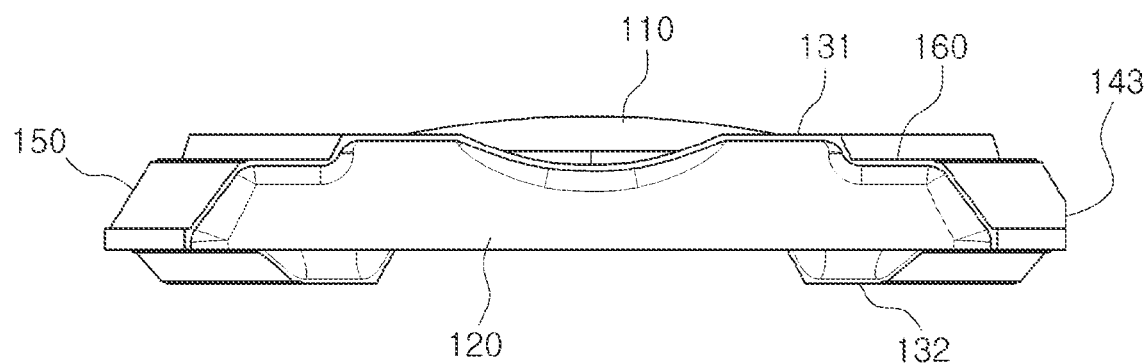
Figure 8:
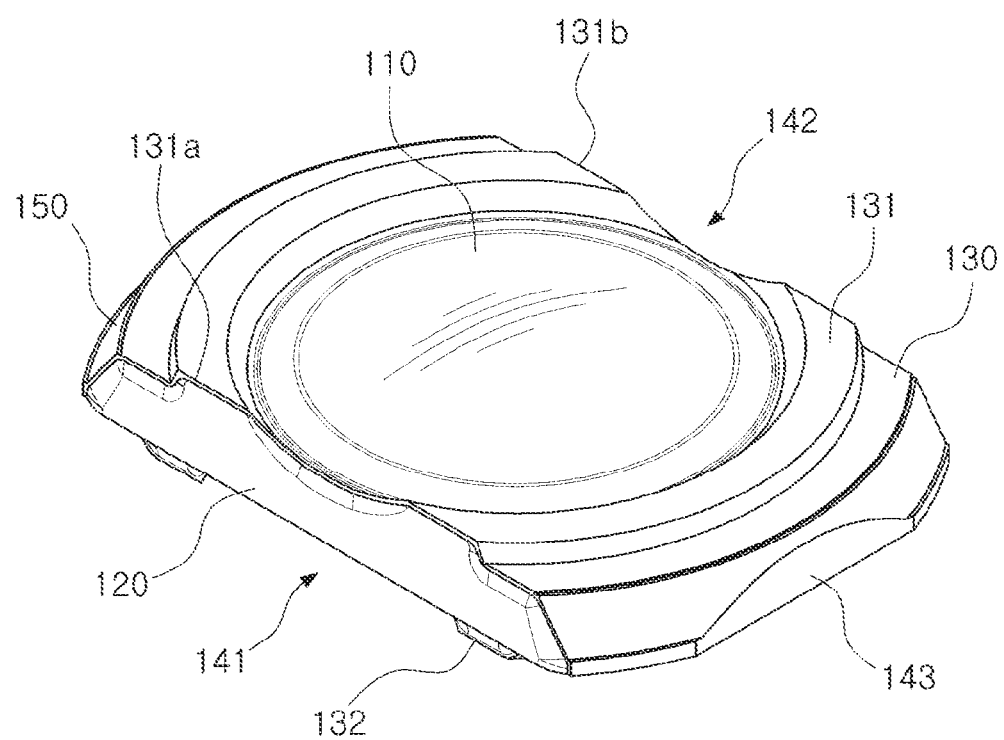
FIGS. 8 and 9 are perspective views of a lens of a lens assembly according to one or more embodiments.
Figure 9:
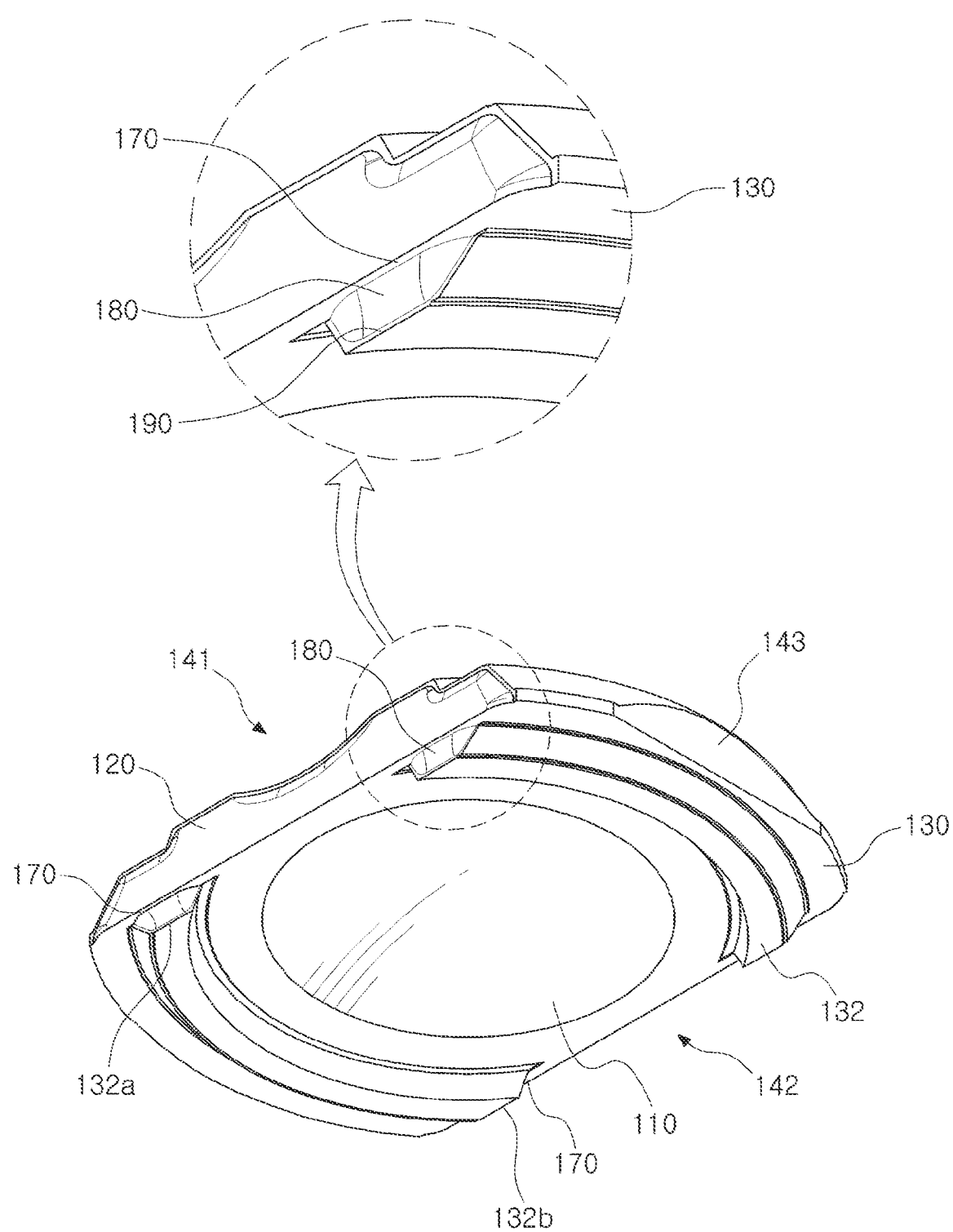

FIGS. 6 and 7 are side views of a lens of a lens assembly according to one or more embodiments. FIGS. 8 and 9 are perspective views of a lens of a lens assembly according to one or more embodiments.

Referring first to FIG. 6, the D-cut portions 140 of the lens 100 may include an inclined surface. As an example, a first inclined surface 120 may be provided to each of the first D-cut portion 141 and the second D-cut portion 142. The first inclined surface 120 may easily separate the mold from the manufactured lens 100.

The first inclined surface 120 may be spaced apart from ends of the D-cut portions 140 by a predetermined interval. As an example, an end 141a of the first D-cut portion 141 and the first inclined surface 120 may be spaced apart from each other in an optical axis direction on the first D-cut portion 141 side, and an end 142a of the second D-cut portion 142 and the first inclined surface 120 may be spaced apart from each other in an optical axis direction on the second D-cut portion 142 side.

A planarized surface 160 may be formed between the end 141a of the first D-cut portion 141 and the first inclined surface 120. In addition, the planarized surface 160 may also be formed between the end 142a of the second D-cut portion 142 and the first inclined surface 120.

That is, the first D-cut portion 141 and the second D-cut portion 142 may include the planarized surfaces 160, as boundary lines that separate the remaining surface (e.g., the first inclined surface 120) of the first D-cut portion 141 and the second D-cut portion 142 from the end 141a of the first D-cut portion 141 and the end 142a of the second D-cut portion 142. The planarized surface 160 may be a planar line that is continuously connected.

In various embodiments, molds forming the optical portion 110 and the D-cut portions 140 may be different from each other. That is, the mold forming the optical portion 110 and the mold forming the D-cut portions 140 may be coupled to each other to thereby manufacture the lens 100 including the optical portion 110 and the D-cut portions 140.

For example, in order to manufacture the lens 100 in the examples described herein, at least four molds may be used. That is, a first movable side mold (not shown) for forming a portion of the flange portion 130 corresponding to one surface (e.g., an object side surface) of the lens 100 and the optical portion 110, a first fixed side mold (not shown) for forming a portion of the flange portion 130 corresponding to the other surface (e.g., an image side surface) of the lens 100 and the optical portion 110, a second movable side mold (not shown) for forming the first D-cut portion 141 and the second D-cut portion 142 of the lens 100, and a second fixed side mold (not shown) for forming the first D-cut portion 141 and the second D-cut portion 142 of the lens 100 may be used.

Here, when the molds (the first movable side mold and the first fixed side mold) for forming the optical portion 110 and the molds (the second movable side mold and the second fixed side mold) for forming the D-cut portions 140 are coupled to each other, a coupling position between molds may be slightly changed by design error and/or manufacturing error.

Defects may occur in the lens manufactured by such design error and/or manufacturing error.

For example, the first inclined surfaces 120 may protrude from the ends 141a and 142a of the D-cut portions 140 due to the change in the coupling position between the molds, and such burrs may have an influence on the optical portion 110 of the lens 100 to change the optical performance, or may have an influence on the flange portion 130 to disable a coupling with the lens barrel 200 or other lenses.

Therefore, in the present embodiments, in order to prevent the defects from occurring in the lens 100 by the design error and/or the manufacturing error, the first inclined surfaces 120 may be always spaced apart from the end 141a of the first D-cut portion 141 and the end 142a of the second D-cut portion 142 by a predetermined interval. Accordingly, even if the design error and/or the manufacturing error occurs, the first inclined surfaces 120 may be prevented from protruding on the end 141a of the first D-cut portion 141 and end 142a of the second D-cut portion 142.

Meanwhile, referring to FIGS. 7 through 9, a first rib 131 that protrudes for coupling with another lens or maintaining an interval with another lens may be provided to the flange portion 130 of one surface (e.g., an object side surface) of the lens 100.

The first rib 131 may be formed on the flange portion 130 along a periphery of the optical portion 110, and both end surfaces 131a and 131b of the first rib 131 may be connected to the first D-cut portion 141 and the second D-cut portion 142. That is, both end surfaces 131a and 131b of the first rib 131 may configure portions of the first D-cut portion 141 and the second D-cut portion 142.

In addition, a second rib 132 that protrudes for coupling with another lens or maintaining an interval with another lens may also be provided to the flange portion 130 of the other surface (e.g., an image side surface) of the lens 100.

The second rib 132 may be formed on the flange portion 130 along a periphery of the optical portion 110, and both end surfaces 132a and 132b of the second rib 131 may not be connected to the first D-cut portion 141 and the second D-cut portion 142.

For example, the end surface 132a of one side of the second rib 132 may be spaced apart from the first D-cut portion 141 by a predetermined interval in a direction perpendicular to the optical axis direction, and the end surface 132b of the other side of the second rib 132 may be spaced apart from the second D-cut portion 142 by a predetermined interval in a direction perpendicular to the optical axis direction.

Since the mold (the second fixed side mold) forming both end surfaces 132a and 132b of the second rib 132 and the mold (the second movable side mold) forming the D-cut portions 140 are different molds, both end surfaces 132a and 132b of the second rib 132 may protrude from the D-cut portions 140 by the design error and/or the manufacturing error, thereby forming burrs.

Therefore, in the present embodiments, the end surface 132a of one side of the second rib 132 may be always spaced apart from the first D-cut portion 141 by the predetermined interval, and the end surface 132b of the other side of the second rib 132 may be always spaced apart from the second D-cut portion 142 by the predetermined interval.

The planarized surface 170 may be formed between the end 132a of one side of the second rib 132 and the first D-cut portion 141. In addition, the planarized surface 170 may also be formed between the end 132b of the other side of the second rib 132 and the second D-cut portion 142.

Both end surfaces 132a and 132b of the second rib 132 may include inclined surfaces. As an example, second inclined surfaces 180 may be provided to both end surfaces 132a and 132b of the second rib. The second inclined surface 180 may easily separate the mold from the manufactured lens 100. Meanwhile, the first inclined surface 120 and the second inclined surface 180 may have inclined directions opposite to each other (see FIG. 6).

Since the mold (the second fixed side mold) forming both end surfaces 132a and 132b of the second rib 132 and the mold (the first fixed side mold) forming the remaining portions of the second rib 132 are different molds, the second inclined surfaces 180 may protrude from the ends of the second rib 132 by the design error and/or the manufacturing error, thereby forming burrs.

Therefore, in the present embodiments, in order to prevent defects from occurring in the lens by the design error and/or the manufacturing error, the second inclined surfaces 180 may always be spaced apart from ends of the second rib 132 by the predetermined interval in the optical axis direction. Accordingly, even if a design error and/or a manufacturing error occurs, the second inclined surfaces 180 may be prevented from protruding from the ends of the second rib 132.

A planarized surface 190 may be formed between the end of the second rib 132 and the second inclined surface 180.

Figure 10:
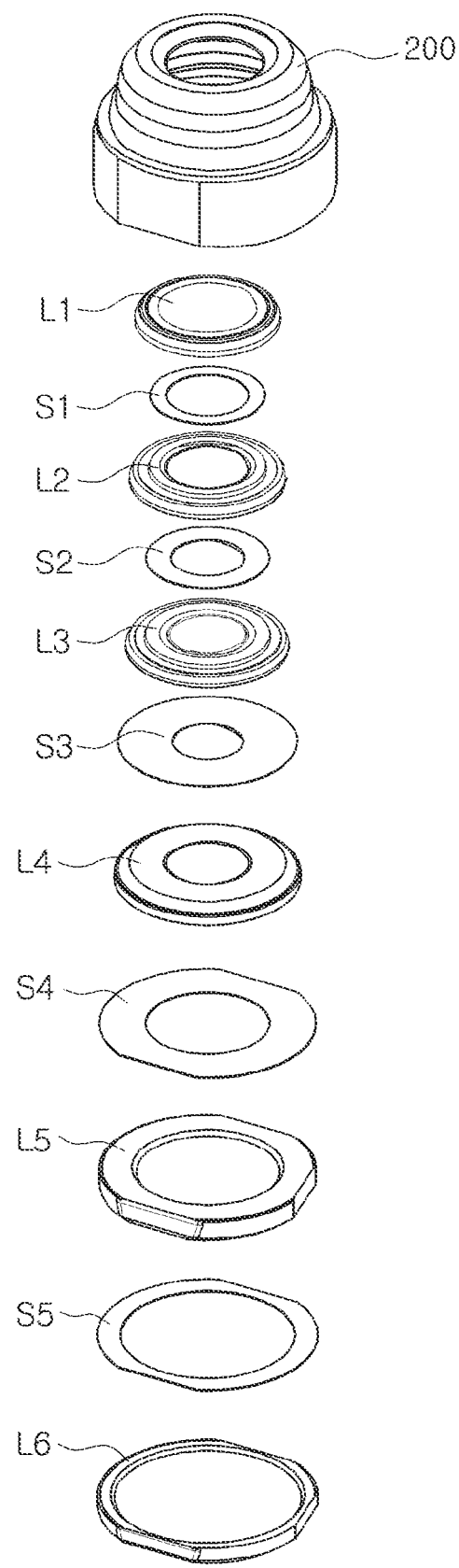
FIG. 10 is an exploded perspective view of a lens assembly according to one or more embodiments.
Figure 11:
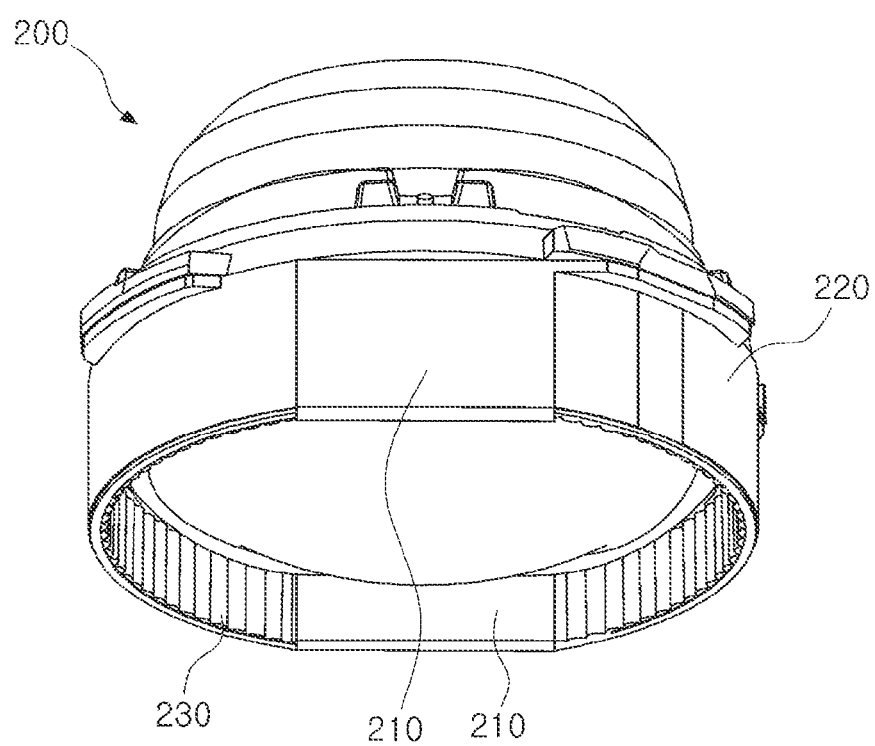
FIG. 11 is a bottom perspective view of a lens barrel of a lens assembly according to one or more embodiments.

FIG. 10 is an exploded perspective view of a lens assembly according to one or more embodiments. FIG. 11 is a bottom perspective view of a lens barrel of the lens assembly according to one or more embodiments.

Referring to FIGS. 10 and 11, the lens assembly 10 may include the lens barrel 200 and a plurality of lenses.

The plurality of lenses may include a first lens L1, a second lens L2, a third lens L3, a fourth lens L4, a fifth lens L5, and a sixth lens L6 that are arranged from an object side to an image side (an image sensor side). However, the plurality of lenses are not limited thereto, but may include five or less, or seven or more lenses.

Spacers may be provided between the lenses adjacent to each other. The spacers may maintain an interval between the lenses. As an example, the spacers may include a first spacer S1, a second spacer S2, a third spacer S3, a fourth spacer S4, and a fifth spacer S5 that are arranged from the object side to the image side (the image sensor side) between the first lens L1 and second lens L2, second lens L2 and third lens L3, third lens L3 and fourth lens L4, fourth lens L4 and fifth lens L5, and fifth lens L5 and sixth lenses L6, respectively.

Among the plurality of lenses, two lenses L5 and L6 disposed to be closest to the image side may be lenses (FIGS. 2 through 9) including D-cut portions 140 and circular arc portions 150, and four lenses L1, L2, L3, and L4 disposed to be closest to the object side may be the circular lenses.

That is, a shape of the two lenses L5 and L6 disposed to be closest to the image side and a shape of the four lenses L1, L2, L3, and L4 disposed to be closest to the object side may be different from each other.

Since the four lenses L1, L2, L3, and L4 disposed to be closest to the object side may be injection-molded, a D-cut portion may be formed at a portion of the lens by removing the gate portion, which is a passage through which the resin material is introduced, but the four lenses L1, L2, L3, and L4 disposed to be closest to the object side may be substantially the circular lenses.

The lens barrel 200 may include the D-cut portions 210 at portions to which the two lenses (for example, the fifth lens L5 and the sixth lens L6) disposed to be closest to the image side are coupled. The inner surface and the outer surface of the lens barrel 200 may be a planar surface in the portions at which the D-cut portions 210 are formed.

The lens assembly 10 used in the portable electronic device 1000 may generally have a short through-the-lens (TTL) for miniaturization. Here, TTL is a distance from an object side surface of the first lens L1 to an imaging surface of the image sensor 41.

Instead of shortening the TTL, a diameter of the optical portion 110 increases in successive lenses of the plurality of lenses as they are disposed closer to the image side in order to secure optical performance.

In the various embodiments of the lens assembly 10, the D-cut portions 140 may be formed symmetrically in relation to the optical axis on the two lenses (for example, the fifth lens L5 and the sixth lens L6) disposed closest to the image side and the D-cut portions 210 may be formed on the lens barrel 200 at the positions corresponding to the D-cut portions 140 of the lenses, such that an overall size of the lens assembly 10 may be reduced and the camera module may be thus miniaturized.

Meanwhile, light reflected from the subject and incident into the lens barrel 200 is refracted while passing through the plurality of lenses. In this case, the refracted light may be unintendedly reflected (for example, reflected from the inner surface of the lens barrel 200), and in a case in which the reflected light is incident on the image sensor 41 or around the image sensor 41, a flare phenomenon may occur.

In a case in which the flare phenomenon occurs, a quality of the captured image may be deteriorated, such as a portion of the captured image may be blurred or a round white spot may appear.

In particular, the size of each component of the lens assembly 10 is reduced according to a miniaturization trend, and accordingly, unintended reflection of light may occur in the lens barrel 200.

However, the various embodiments of the lens assembly 10 may prevent the occurrence of such a flare phenomenon due to the reflected light even if light is reflected from an inner surface of the lens barrel 200.

As an example, referring to FIG. 11, the lens assembly 10 according to embodiments may be configured so that a straight-line distance between the inner surface of the lens barrel 200 and the optical axis is changed according to a circumference direction. Here, the inner surface of the lens barrel 200 may be a portion at which the D-cut portions are not formed, that is, the circular arc portion 220.

Therefore, the inner surface of the lens barrel 200 may be configured so that an angle at which the light is reflected is different according to a position at which the light is reflected. That is, the inner surface of the lens barrel 200 may be configured so that the reflected light is scattered even if the light is reflected. Accordingly, the light reflected by the inner surface of the lens barrel 200 may be prevented from gathering at one point, and the occurrence of the flare phenomenon may be prevented.

A plurality of protrusions 230 protruding to the optical axis may be formed along the circumference direction on at least a portion (for example, the circular arc portion 220) of the inner surface of the lens barrel 200.

Each of the plurality of protrusions 230 may have a length in the optical direction, and a surface of each protrusion 230 may be a curved surface having a curvature. As an example, a plurality of protrusions 230 having a convex surface may be formed on the inner surface of the lens barrel 200 along the circumference direction.

In addition, at least a portion (for example, the circular arc portion 220) of the inner surface of the lens barrel 200 may be formed so that a diameter thereof is changed along the circumference direction of the lens barrel 200, by the plurality of protrusions 230.

As an example, the straight-line distance between the inner surface of the lens barrel 200 and the optical axis may be changed along the circumference direction.

Therefore, in a case in which light is reflected from the plurality of protrusions 230, the reflected light may be scattered and may not be gathered at one point. Accordingly, the occurrence of the flare phenomenon may be prevented.

Figure 12:
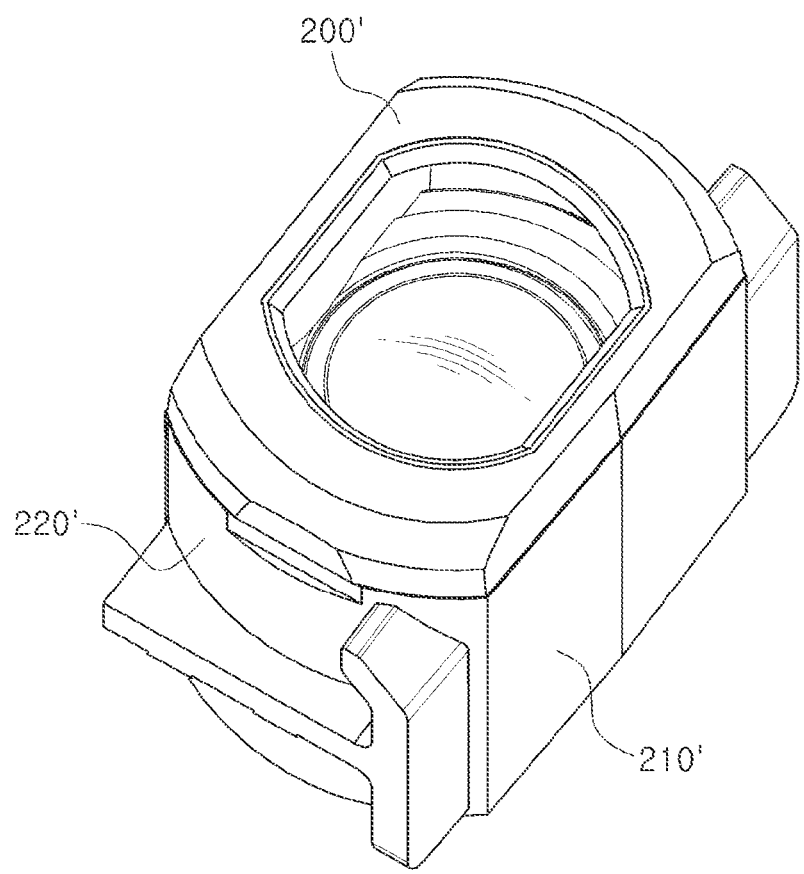
FIG. 12 is a perspective view of a lens assembly according to one or more embodiments.
Figure 13:
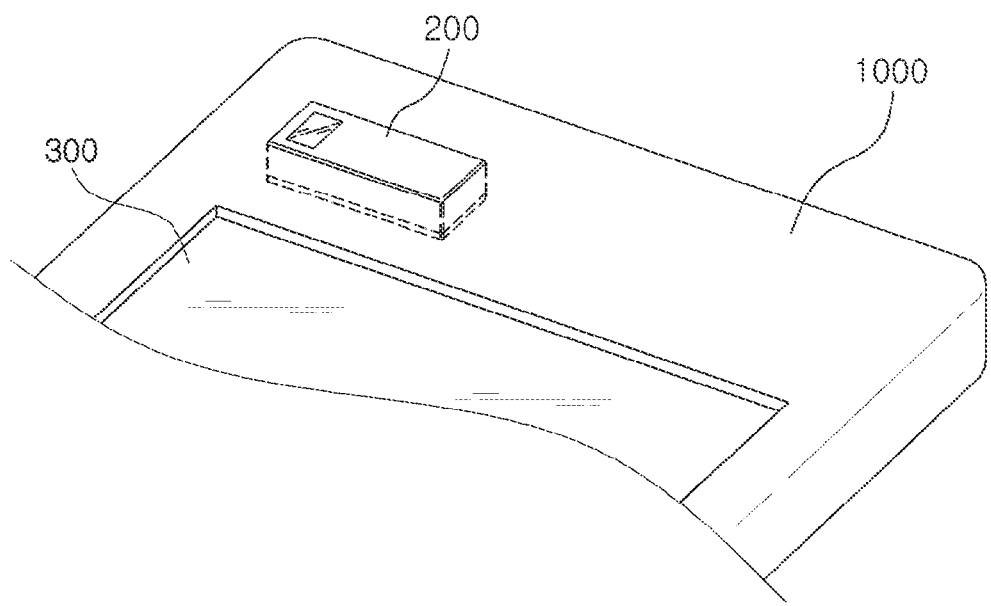
FIG. 13 is a perspective view illustrating a lens assembly mounted on a portable electronic device according to one or more embodiments.

FIG. 12 is a perspective view of a lens assembly according to one or more embodiments. FIG. 13 is a perspective view illustrating a lens assembly mounted on a portable electronic device according to one or more embodiments.

In the present embodiments, the plurality of lenses may be disposed so that optical axes thereof are perpendicular to a thickness direction of the portable electronic device 1000 (a direction from a front surface of the portable electronic device 1000 to a rear surface thereof or a direction opposite thereto) (see FIG. 13).

As an example, the optical axes of the plurality of lenses may be formed in a width direction or a length direction of the portable electronic device 1000.

In a case in which the axes of the plurality of lenses are formed in the thickness direction of the portable electronic device 1000, a height of the camera module in the optical axis may have an influence on a thickness of the portable electronic device 1000.

In a case in which the camera module mounted on the portable electronic device 1000 has an auto-focusing (AF) and optical image stabilizer (OIS) function, since a size of the camera module is increased as compared to a general camera module, a size of the portable electronic device 1000 on which the camera module is mounted may also be increased.

However, in the lens assembly 10 according to one or more of the various embodiments, since the axes of the plurality of lenses are disposed to be perpendicular to the thickness direction of the portable electronic device 1000, a height of the lens assembly 10 in the optical axis direction may not have an influence on the thickness of the portable electronic device 1000.

Therefore, the thickness of the portable electronic device 1000 may be reduced regardless of the height of the lens assembly 10 in the optical axis direction.

Although not illustrated in FIGS. 12 and 13, a reflective member may be provided in front of the lens assembly 10.

Typically, light may be incident in the thickness direction of the portable electronic device 1000. In the lens assembly according to the one or more embodiments, since the optical axes of the plurality of lenses are formed in the direction perpendicular to the thickness direction of the portable electronic device 1000, the reflective member may be provided in front of the lens assembly 10 to change a traveling direction of the light.

The reflective member may be a mirror or a prism capable of reflecting, refracting, or both reflecting and refracting, the traveling direction of the light by 90°.

Referring to FIG. 12, in the present embodiments, all lenses of the lens assembly 10 may be lenses including the D-cut portions 140 formed to be symmetrical with each other in relation to the optical axis (see, for example, the lenses of FIGS. 2 through 9).

In addition, a lens barrel 200' may also include D-cut portions 210' formed to be symmetrical with each other in relation to the optical axis. By the D-cut portions 210', one surface and the other surface of the lens barrel 200' may be a plane shape as a whole.

By the configuration as described above, the overall size of the lens assembly may be reduced and the camera module may be thus miniaturized.

As set forth above, according to the one or more embodiments, the lens assembly and the camera module including the same may reduce the size of the lens assembly while securing the performance of the lens assembly.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
    a lens comprising:
        an optical portion configured to refract light; and
        a flange portion extending along a periphery of at least a portion of the optical portion; and
    a lens barrel accommodating the lens,
    wherein the flange portion comprises:
        a first D-cut portion on one side surface of the flange portion and spaced apart from the lens barrel;
        a second D-cut portion on another side surface of the flange portion and spaced apart from the lens barrel; and
        circular arc portions connecting the first D-cut portion and the second D-cut portion to each other and contacting the lens barrel,
    wherein the first D-cut portion comprises a first inclined surface spaced apart from an edge of the first D-cut portion by a predetermined interval in an optical axis direction, and
    the second D-cut portion comprises a first inclined surface spaced apart from an edge of the second D-cut portion by a predetermined interval in the optical axis direction.

2. The lens assembly of claim 1, wherein the first D-cut portion further comprises a planarized surface between the first inclined surface of the first D-cut portion and the edge of the first D-cut portion, and
    the second D-cut portion further comprises a planarized surface between the first inclined surface of the second D-cut portion and the edge of the second D-cut portion.

3. The lens assembly of claim 1, wherein the lens further comprises a first rib protruding from a first surface of the flange portion along the periphery of the at least a portion of the optical portion,
    a first end surface of the first rib is connected to the first D-cut portion, and
    a second end surface of the first rib is connected to the second D-cut portion.

4. The lens assembly of claim 1, wherein the lens further comprises a second rib protruding from a second surface of the flange portion along the periphery of the at least a portion of the optical portion,
    a first end surface of the second rib is spaced apart from the first D-cut portion by a predetermined interval, and
    a second end surface of the second rib is spaced apart from the second D-cut portion by a predetermined interval.

5. The lens assembly of claim 4, wherein the flange portion further comprises:
    a planarized surface between the first end surface of the second rib and the first D-cut portion; and
    a planarized surface between the second end surface of the second rib and the second D-cut portion.

6. The lens assembly of claim 4, wherein the first end surface of the second rib comprises a second inclined surface spaced apart by a predetermined interval from an edge of the first end surface of the second rib; and
    the second end surface of the second rib comprises a second inclined surface spaced apart by a predetermined interval from an edge of the second end surface of the second rib.

7. The lens assembly of claim 6, wherein the first end surface of the second rib further comprises a planarized surface between the second inclined surface of the first end surface of the second rib and the edge of the first end surface of the second rib, and
    the second end surface of the second rib further comprises a planarized surface between the second inclined surface of the second end surface of the second rib and the edge of the second end surface of the second rib.

8. The lens assembly of claim 6, wherein the first inclined surface of the first D-cut portion and the second inclined surface of the first end surface of the second rib are inclined in opposite directions relative to each other, and the first inclined surface of the second D-cut portion and the second inclined surface of the second end surface of the second rib are inclined in opposite directions relative to each other.

9. The lens assembly of claim 1, wherein the circular arc portions comprise at least three surfaces contacting the lens barrel.

10. The lens assembly of claim 1, wherein one of the circular arc portions comprises a third D-cut portion spaced apart from the lens barrel.

11. The lens assembly of claim 10, wherein a length of a shortest straight line connecting the first D-cut portion and the second D-cut portion to each and passing through an optical axis of the optical portion is shorter than a length of a shortest straight line connecting the circular arc portions to each other and passing through the optical axis.

12. The lens assembly of claim 10, wherein the first D-cut portion, the second D-cut portion, and the third D-cut portion each comprise a planar surface.

13. The lens assembly of claim 12, wherein a surface roughness of the planar surface of the first D-cut portion and a surface roughness of the planar surface of the second D-cut portion are different from a surface roughness of the planar surface of the third D-cut portion.

14. The lens assembly of claim 1, further comprising another lens disposed in the lens barrel closer to an object side of the lens barrel than the lens,
wherein a shape of the other lens is different from a shape of the lens.

15. A portable electronic device comprising a camera module comprising the lens assembly of claim 1.

16. A camera module comprising:
a lens comprising:
an optical portion configured to refract light; and
a flange portion extending along a periphery of at least a portion of the optical portion; and
a lens barrel accommodating the lens,
wherein the flange portion comprises:
a first D-cut portion;
a second D-cut portion opposing the first D-cut portion across an optical axis;
circular arc portions connecting the first D-cut portion and the second D-cut portion to each other; and
a third D-cut portion formed in one of the circular arc portions,
the circular arc portions contact the lens barrel,
the first D-cut portion, the second D-cut portion, and the third D-cut portion are spaced apart from the lens barrel,
the first D-cut portion comprises a first boundary portion separating a remaining portion of the first D-cut portion from an edge of the first D-cut portion;
the second D-cut portion comprises a second boundary portion separating a remaining portion of the second D-cut portion from an edge of the second D-cut portion,
the remaining portion of the first D-cut portion comprises an inclined surface, and
the remaining portion of the second D-cut portion comprises an inclined surface.

17. The camera module of claim 16, wherein the first boundary portion comprises a first continuous planarized surface separating the remaining portion of the first D-cut portion from the edge of the first D-cut portion; and
the second boundary portion comprises a second continuous planarized surface separating the remaining portion of the second D-cut portion from the edge of the second D-cut portion.

18. A portable electronic device comprising:
the camera module of claim 16; and
a display,
wherein the camera module is installed as a front camera of the portable electronic device along with the display on one side of the portable electronic device, or as a back camera of the portable electronic device on a side of the portable electronic device other than a side of the portable electronic device on which the display is installed.

19. The lens assembly of claim 1, wherein a length of a shortest straight line connecting the first D-cut portion and the second D-cut portion to each and passing through an optical axis of the optical portion is shorter than a length of a shortest straight line connecting the circular arc portions to each other and passing through the optical axis.

* * * * *